UNITED STATES PATENT OFFICE.

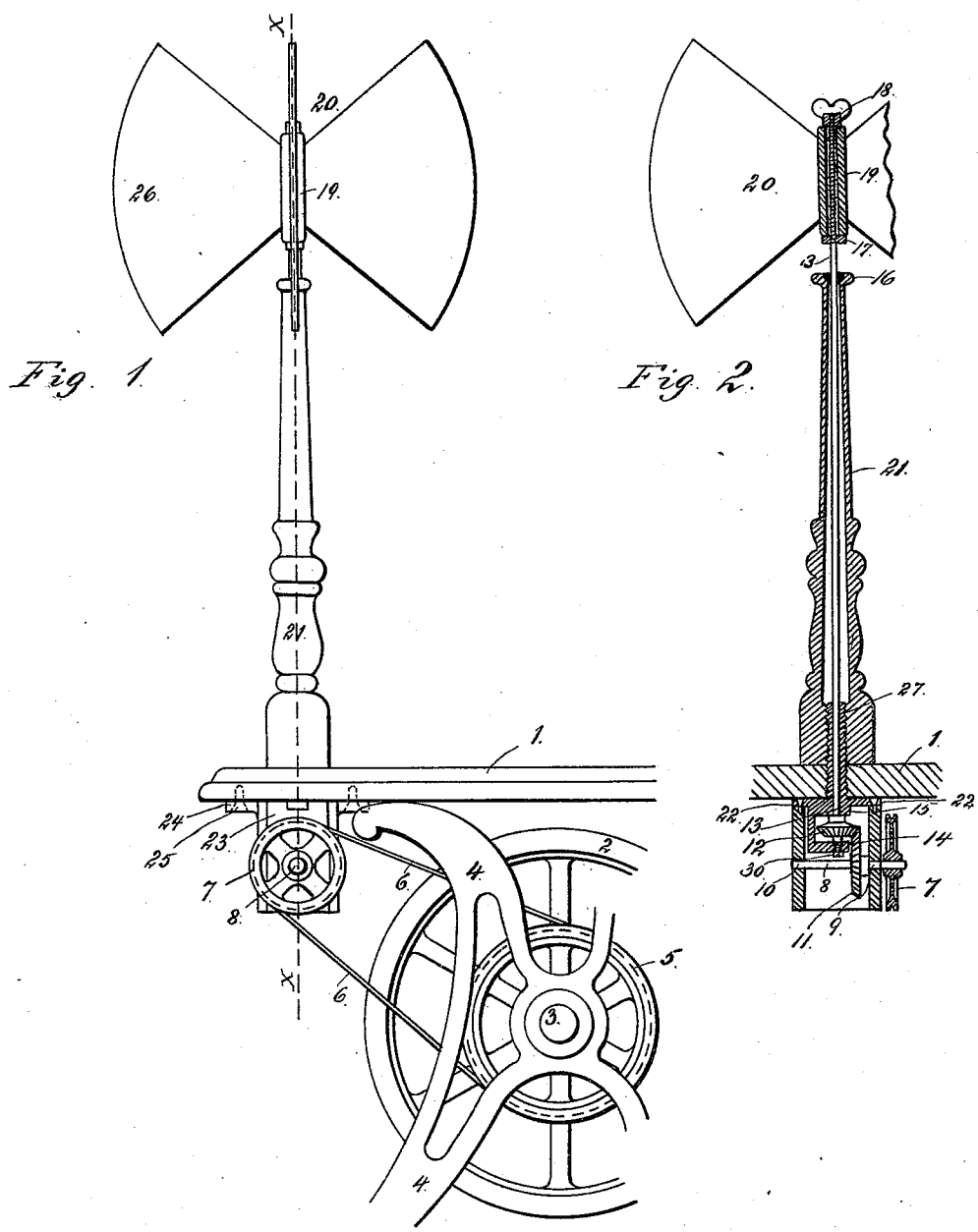

JOHN H. O'NEIL, OF PHILADELPHIA, PENNSYLVANIA.

FAN ATTACHMENT FOR SEWING-MACHINES.

SPECIFICATION forming part of Letters Patent No. 457,167, dated August 4, 1891.

Application filed January 18, 1889. Serial No. 296,771. (No model.)

*To all whom it may concern:*

Be it known that I, JOHN H. O'NEIL, a citizen of the United States, residing at Philadelphia, in the county of Philadelphia and State of Pennsylvania, have invented certain new and useful Improvements in Fan Attachments for Sewing-Machines; and I do hereby declare the following to be a sufficiently full, clear, and exact description thereof as to enable others skilled in the art to make and use the said invention.

This invention relates to an attachment for sewing-machines to fan the operator of sewing-machines and persons contiguous thereto; and it consists in a construction and combination of parts propelled by a rotary motion derived from the driving-power of the sewing-machine, as hereinafter fully described, and shown in the accompanying drawings, in which—

Figure 1 shows a rear elevation of the upper portion of a sewing-machine table with this invention applied, and Fig. 2 a vertical section thereof in the plane indicated by the dotted lines *x x* in Fig. 1.

The same reference-marks indicate like parts in both figures.

1 represents the table-top; 2, the balance-wheel; 3, the crank-shaft; 4, the leg-frame in which the crank-shaft is supported and turns.

5 is an adjustable grooved pulley fitted to the hub of and arranged to turn with the balance or driving wheel 6, an endless cord conveying motion to grooved wheel 7, secured to and turning on arbor 8, turning in bearings 9 and 10 and turning with it a toothed wheel 11, which engages in the teeth of a pinion 12 on an upright arbor 13, supported and turning in bearings 14, 15, and 16. The grooved pulley 5 is attached to the hub of the balance or driving wheel 2 by a set-screw, and is adjustable on the hub of the said wheel 2—that is, it can be moved back and forth between the legs of a machine and the balance-wheel, so as to always be in direct line with the pulley 7. The arbor 13 is made elastic and light. The upper end of the arbor 13 is screw-threaded and provided with nuts 17 and 18, between which the hub 19 of a fan 20 is clamped. The upper bearing 16 of the fan-arbor 13 is formed on the top of a column 21, preferably made of wood and chambered sufficiently to avoid danger of contact with the arbor 13, and screw-threaded internally, so as to screw upon a screw-thread 27, formed on the outside of the bearing 15. The bearing 15 is formed integrally with flanges 22 (adapted to fit in a casting 23) and also with the lower bearing 14 of the arbor 13, which arbor rests upon a pivot-step 30 or end-thrust bearing, on which the lower end of the arbor 13 rotates. The bearing 14 is preferably made of a hardened screw 30, as shown in the drawings, and the lower end of the arbor made convex and also hardened, so as to avoid friction. The bearings 9 and 10 are formed integrally with a flanged casting 23, which rests against the under side of the table 1, the flange 24 being interposed between the flanges 22 and the table and secured thereto by screw 25. The arrangement of bearings of the arbors 13 and 8 divides the strain incident to the draft of the band 6 and the thrust of the toothed wheels 11 and 12, and by being firmly held together avoid cramping from the strain of fastening the attachment to the table. The flexible arbor and chambered column, while affording support to the arbor 13 and fan 20, afford a facility for adapting the fixture to sewing-machine tables of different thicknesses, which is further facilitated by the screw-threaded portion of the arbor 13 and nuts 17 and 18. The wings 26 of the fan 20 may be either vertical or oblique to the horizontal plane, according to the direction in which it is desired to agitate the air. Holes for wood-screws are formed in the flange 24, by means of which the attachment may (after adjusting it by the screw 27 and pillar 21 to run the band properly) be permanently fastened to the table.

Having described my invention, what I claim is—

In a fan attachment for sewing-machines, the flexible fan-arbor 13, the internally-screw-threaded pillar 21, the grooved pulley located on the hub of the balance-wheel of the sewing-machine, and the table 1, in combination with the bearing 15, provided with a perpendicular hollow externally-screw-threaded extension, and the flange 22, extending at right angles from the perpendicular extension beneath the table, the toothed wheel 11, pinion 12, belt 6, and pulley 7, the said screw-threaded extension projecting through the said table, so as to secure the pillar thereto and to form a bearing for the arbor, and the said bearing with its flange arranged to be secured to the under side of the table, so as to support the said pinion, substantially as shown and described.

JOHN H. O'NEIL.

Witnesses:
J. DANIEL EBY,
ALEX. H. SIEGEL.